(12) United States Patent
Masuda et al.

(10) Patent No.: US 8,084,542 B2
(45) Date of Patent: Dec. 27, 2011

(54) SHAPED ARTICLE COMPOSED OF AN ACRYLIC RUBBER COMPOSITION

(75) Inventors: Hirofumi Masuda, Tokyo (JP); Yoshiaki Aimura, Tokyo (JP); Kiyonori Umetsu, Tokyo (JP)

(73) Assignee: Zeon Corporation, Tokyo (JP)

( * ) Notice: Subject to any disclaimer, the term of this patent is extended or adjusted under 35 U.S.C. 154(b) by 524 days.

(21) Appl. No.: 12/198,603

(22) Filed: Aug. 26, 2008

(65) Prior Publication Data

US 2009/0005512 A1 Jan. 1, 2009

Related U.S. Application Data

(62) Division of application No. 10/517,705, filed as application No. PCT/JP03/07472 on Jun. 12, 2003, now abandoned.

(30) Foreign Application Priority Data

Jun. 12, 2002 (JP) .................................. 2002-171951
Jun. 27, 2002 (JP) .................................. 2002-188019
Jul. 10, 2002 (JP) .................................. 2002-200807

(51) Int. Cl.
*C08L 33/10* (2006.01)

(52) U.S. Cl. ..................... 525/222; 525/208; 525/329.1; 525/329.7; 525/329.9; 525/374; 526/317.1

(58) Field of Classification Search .................. 525/208, 525/329.1, 329.7, 329.9, 374; 526/317.1
See application file for complete search history.

(56) References Cited

U.S. PATENT DOCUMENTS

| | | | |
|---|---|---|---|
| 3,196,133 A * | 7/1965 | Piloni et al. .................. 526/296 |
| 3,883,472 A | 5/1975 | Greene et al. | |
| 3,904,588 A | 9/1975 | Greene | |
| 3,981,987 A * | 9/1976 | Linke et al. ..................... 424/47 |
| 4,820,774 A | 4/1989 | Takao et al. | |
| 5,618,884 A | 4/1997 | Cai et al. | |
| 6,045,902 A | 4/2000 | Imanishi et al. | |
| 6,329,450 B1 | 12/2001 | Ogoe et al. | |
| 2001/0005742 A1 * | 6/2001 | Moriyama et al. ......... 526/317.1 |

FOREIGN PATENT DOCUMENTS

| | | |
|---|---|---|
| EP | 0 905 182 B1 | 1/2003 |
| JP | 50-45031 B | 4/1975 |
| JP | 61-225243 A | 10/1986 |
| JP | 61293255 A | 12/1986 |
| JP | 62-138511 A | 6/1987 |
| JP | 63-68613 A | 3/1988 |
| JP | 2-269709 A | 11/1990 |
| JP | 3-62867 A | 3/1991 |
| JP | 11-92614 A | 4/1999 |
| JP | 2001-131224 A | 5/2001 |
| JP | 2001-181356 A | 7/2001 |
| JP | 2001-207008 A | 7/2001 |
| JP | 2001-240623 A | 9/2001 |

* cited by examiner

*Primary Examiner* — Michael M Bernshteyn

(74) *Attorney, Agent, or Firm* — Birch, Stewart, Kolasch & Birch, LLP

(57) ABSTRACT

An acrylic rubber comprised of a copolymer comprising 0.1 to 20% by weight of (A) units of a butenedioic acid monoester monomer having an alicyclic structure and 50 to 99.9% by weight of (B) units of at least one kind of monomer selected from acrylic acid ester monomers and methacrylic acid ester monomers. A crosslinkable acrylic rubber composition comprising the acrylic rubber and a crosslinking agent, especially a polyamine crosslinking agent, has good process-stability and good shapability and gives a shaped article having high heat resistance and exhibiting reduced permanent set.

15 Claims, No Drawings

SHAPED ARTICLE COMPOSED OF AN ACRYLIC RUBBER COMPOSITION

This application is a Divisional of application Ser. No. 10/517,705 filed on Dec. 13, 2004 now abandoned and for which priority is claimed under 35 U.S.C. §120. application Ser. No. 10/517,705 is the national phase of PCT International Application No. PCT/JP03/07472 filed on Jun. 12, 2003 under 35 U.S.C. §371. PCT/JP03/07472 claims priority to 2002-171951, 2002-188019 and 2002-200807 filed in Japan on Jun. 12, 2002, Jun. 27, 2002 and Jul. 10, 2002, respectively. The entire contents of each of the above-identified applications are hereby incorporated by reference.

TECHNICAL FIELD

This invention relates to an acrylic rubber, a crosslinkable acrylic rubber composition comprising the acrylic rubber, and a shaped article made by crosslinking and shaping the crosslinkable acrylic rubber composition.

BACKGROUND ART

An acrylic rubber has good heat resistance and good oil resistance, and therefore, is widely used in an automobile field and related fields as a material for rubber parts which include, for example, sealers such as gasket and packing, hoses, vibration insulators, tubes and belts. Acrylic rubbers suitable for these rubber parts have a rubber elasticity formed by crosslinking an acrylic rubber having active crosslinking sites introduced therein usually by copolymerization of 1 to 5% by weight of a crosslink-forming monomer.

The choice of a crosslink-forming monomer as well as a crosslinking agent used in combination therewith materially affects a rate of crosslinking reaction, which influences storage stability, mechanical properties, permanent set, heat resistance and other properties. In general, as the crosslink-forming monomer, there can be mentioned chlorine-containing monomers such as 2-chloroethyl vinyl ether and vinyl chloroacetate, and epoxy monomers such as allyl glycidyl ether.

Crosslinked products having good physical properties can be obtained by using these crosslink-forming monomers. However, a crosslinked product obtained by copolymerization of a chlorine-containing monomer tends to cause corrosion of metal having contact with the crosslinked product.

The use of monoesters of a butenedioic acid such as maleic acid and fumaric acid as a crosslink-forming monomer has been proposed in, for example, Japanese Unexamined Patent Publication S50-45031 and ibid. H11-92614. Especially it has been reported therein that an acrylic rubber composition comprising an acrylic rubber having copolymerized therein 0.1 to 10% by weight of a mono-lower alkyl ester of fumaric acid, and an aromatic diamine crosslinking agent and a guanidine compound crosslinking aid, gives a crosslinked product causing corrosion of metal in a lesser extent and having high heat resistance. However, this acrylic rubber composition has a problem such that scorching is liable to occur during processing, especially at an initial shaping stage when extrusion shaping is conducted.

DISCLOSURE OF THE INVENTION

An object of the present invention is to provide an acrylic rubber composition characterized as being not scorched at an initial shaping stage, even though a crosslinking agent is incorporated therein, and giving a crosslinked acrylic rubber article having high heat resistance and reduced permanent set.

Other objects of the present invention are to provide an acrylic rubber composition characterized as being not scorched at a time of filling the rubber composition in a mold, exhibiting good releasability from the mold, and having no mold flash remaining in the mold, in a step of molding such as compression molding, transfer molding or injection molding; and exhibiting good scorch resistance in an initial shaping stage and giving an extruded article having a smooth surface, in a step of extrusion shaping; and further to provide a shaped article made by shaping the acrylic rubber composition.

The present inventors made an extensive search to achieve the above-mentioned objects and found that a novel acrylic rubber made by copolymerization of an acrylic acid ester monomer or a methacrylic acid ester monomer with a specific butenedioic acid monoester compound as a crosslink-forming monomer, is not scorched or is scorched only to a minimized extent over the shaping course spanning from the initial shaping stage to immediately before the crosslinking stage when an acrylic rubber composition comprising the acrylic rubber and a crosslinking agent is subjected to extrusion shaping or molding, and further found that the acrylic rubber composition gives a crosslinked and shaped article having high heat resistance and exhibiting sufficiently reduced permanent set. Based on these findings, the present invention has been completed.

In a first aspect of the present invention, there is provided an acrylic rubber comprised of a copolymer comprising 0.1 to 20% by weight of (A) units of a butenedioic acid monoester monomer having an alicyclic structure and 50 to 99.9% by weight of (B) units of at least one kind of monomer selected from acrylic acid ester monomers and methacrylic acid ester monomers.

In a second aspect of the present invention, there is provided a crosslinkable acrylic rubber composition comprising the above-mentioned acrylic rubber and a crosslinking agent.

In a third aspect of the present invention, there is provided a shaped article obtainable by shaping the above-mentioned acrylic rubber composition.

BEST MODE FOR CARRYING OUT THE INVENTION

Acrylic Rubber

The acrylic rubber of the present invention is characterized by being comprised of a copolymer comprising 0.1 to 20% by weight of (A) units of a butenedioic acid monoester monomer having an alicyclic structure (said units are hereinafter abbreviated to as "monomer units (A)" when appropriate) and 50 to 99.9% by weight of (B) units of at least one kind of monomer selected from acrylic acid ester monomers and methacrylic acid ester monomers (said units are hereinafter abbreviated to as "monomer units (B)" when appropriate). The copolymer constituting this acrylic rubber can comprise, if desired, units derived from a copolymerizable monomer, in addition to the monomer units (A) and the monomer units (B).

The monomer units (A) are structural units produced by polymerizing a butenedioic acid monoester monomer (a) having an alicyclic structure (said monomer is hereinafter abbreviated to as "monomer (a)" when appropriate). The monomer (a) is a compound having a mono-ester structure formed, for example, by the reaction of one carboxyl group of a butenedioic acid, i.e., maleic acid or fumaric acid, with an alcohol having an alicyclic structure. The method of synthesizing the monomer (a) is not particularly limited.

The alicyclic structure usually has 3 to 20 carbon atoms, preferably 4 to 10 carbon atoms, and may be either a saturated ring or an unsaturated ring, and may be either monocyclic or polycyclic. More specifically the alicyclic structure includes, for example, a monocycloalkane structure, a monocycloalkene structure, a tetraline structure, a norbornane ring structure and a norbornene ring structure. The alicyclic structure may be a combination of these structures. Of these structures, a monocycloalkane structure and a monocycloalkene structure are preferable. A monocycloalkane structure is especially preferable.

The alcohol having an alicyclic structure may be any of cycloalkyl alcohols, cycloalkenyl alcohols, and alcohols having the above-mentioned alicyclic structure at part of the main chain or at a side chain. In the present invention, cycloalkyl alcohols and cycloalkenyl alcohols are preferable. Cycloalkyl alcohols are especially preferable.

As specific examples of the monomer (a), there can be mentioned fumaric acid mono-cycloalkyl ester monomers such as mono-cyclopentyl fumarate, mono-cyclohexyl fumarate, mono-cycloheptyl fumarate, mono-cyclooctyl fumarate, mono-methylcyclohexyl fumarate, mono-3,5-dimethylcyclohexyl fumarate, mono-dicyclopentanyl fumarate and mono-isobornyl fumarate; fumaric acid mono-cycloalkenyl ester monomers such as mono-cyclopentenyl fumarate, mono-cyclohexenyl fumarate, mono-cycloheptenyl fumarate, mono-cyclooctenyl fumarate and mono-dicyclopentadienyl fumarate; maleic acid mono-cycloalkyl ester monomers such as mono-cyclopentyl maleate, mono-cyclohexyl maleate, mono-cycloheptyl maleate, mono-cyclooctyl maleate, mono-methylcyclohexyl maleate, mono-3,5-dimethylcyclohexyl maleate, mono-dicyclopentyl maleate and mono-isobornyl maleate; maleic acid mono-cycloalkenyl ester monomers such as mono-cyclopentenyl maleate, mono-cyclohexenyl maleate, mono-cycloheptenyl maleate, mono-cyclooctenyl maleate and mono-dicyclopentadienyl maleate; and monoester monomers of an alcohol having an alicyclic structure at part of the main chain or at a side chain such as monoesters of 4-cylohexylbutyl-1-ol with fumaric acid or maleic acid, and monoesters of 2-cylohexylbutyl-1-ol with fumaric acid or maleic acid. Of these, monocyclohexyl fumarate and monocyclohexyl maleate are preferable.

The content of the monomer units (A) in the acrylic rubber is usually in the range of 0.1 to 20% by weight, preferably 0.5 to 10% by weight and more preferably 1 to 5% by weight. If the content of the monomer units (A) is too small, a resulting crosslinked rubber product has a low crosslink density and poor mechanical properties. When a rubber composition is molded, the crosslinked rubber product sticks to a mold and is difficult to release from the mold. When a rubber composition is extrusion-shaped, the resulting product is poor in surface smoothness. In contrast, if the content of the monomer units (A) is too large, a resulting crosslinked rubber product is liable to exhibit reduced elongation and increased permanent set.

The above-mentioned acrylic rubber preferably has a carboxyl group content in the range of $5 \times 10^{-4}$ to $4 \times 10^{-1}$ equivalent, more preferably $2 \times 10^{-3}$ to $2 \times 10^{-1}$ equivalent and especially preferably $4 \times 10^{-3}$ to $1 \times 10^1$ equivalent, per 100 g of rubber. If the content of carboxyl group in the acrylic rubber is too small, crosslinking does not proceed to a desired extent and a crosslinked rubber product is liable to have poor form retention. In contrast, if the content of carboxyl group is too large, a crosslinked rubber product is hard and has poor rubber elasticity.

The monomer units (B) are structural units produced by polymerizing at least one kind of monomer (b) selected from acrylic acid ester monomers and methacrylic acid ester monomers (said monomer is hereinafter abbreviated to "monomer (b)" when appropriate). The monomer (b) includes acrylic acid alkyl ester monomers, methacrylic acid alkyl ester monomers, acrylic acid alkoxyalkyl ester monomers, methacrylic acid alkoxyalkyl ester monomers, acrylic acid hydroxyalkyl ester monomers and methacrylic acid hydroxyalkyl ester monomers. Of these, acrylic acid alkyl ester monomers, acrylic acid alkoxyalkyl ester monomers, methacrylic acid alkyl ester monomers and methacrylic acid alkoxyalkyl ester monomers are preferable.

The acrylic acid alkyl ester monomers and the methacrylic acid alkyl ester monomers preferably include those in which the alcohol residue comprises an alkyl group having 1 to 8 carbon atoms. As specific examples of the acrylic acid alkyl ester monomers and the methacrylic acid alkyl ester monomers, there can be mentioned methyl acrylate, ethyl acrylate, n-propyl acrylate, n-butyl acrylate, isopropyl acrylate, isobutyl acrylate, n-hexyl acrylate, 2-ethylhexyl acrylate and cyclohexyl acrylate; and methyl methacrylate, ethyl methacrylate., n-propyl methacrylate, n-butyl methacrylate, isopropyl methacrylate, isobutyl methacrylate, n-hexyl methacrylate, 2-ethylhexyl methacrylate and cyclohexyl methacrylate. Of these, ethyl acrylate, n-butyl acrylate, ethyl methacrylate and n-butyl methacrylate are preferable.

The acrylic acid alkoxyalkyl ester monomers and the methacrylic acid alkoxyalkyl ester monomers preferably include those in which the alcohol residue comprises an alkoxyalkyl group having 2 to 8 carbon atoms. As specific examples of the acrylic acid alkoxyalkyl ester monomers and the methacrylic acid alkoxyalkyl ester monomers, there can be mentioned methoxymethyl acrylate, ethoxymethyl acrylate, 2-ethoxyethyl acrylate, 2-butoxyethyl acrylate., 2-methoxyethyl acrylate, 2-propoxyethyl acrylate, 3-methoxypropyl acrylate, 4-methoxybutyl acrylate, methoxymethyl methacrylate, ethoxymethyl methacrylate, 2-ethoxyethyl methacrylate, 2-butoxyethyl methacrylate, 2-methoxyethyl methacrylate, 2-propoxyethyl methacrylate, 3-methoxypropyl methacrylate and 4-methoxybutyl acrylate. Of these, 2-ethoxyethyl acrylate, 2-methoxyethyl acrylate, 2-ethoxyethyl methacrylate and 2-methoxyethyl methacrylate are preferable.

The content of the monomer units (B) in the acrylic rubber is usually in the range of 50 to 99.9% by weight, preferably 60 to 95% by weight and more preferably 80 to 92% by weight. If the content of the monomer units (B) in the acrylic rubber is too small, a resulting crosslinked rubber product is liable to have poor heat resistance and poor oil resistance.

The monomer units (B) are preferably comprised of 30 to 100% by weight of units of a monomer selected from acrylic acid alkyl ester monomers and methacrylic acid alkyl ester monomers, and 0 to 70% by weight of a monomer selected from acrylic acid alkoxyalkyl ester monomers and methacrylic acid alkoxyalkyl ester monomers.

The acrylic rubber of the present invention may comprise, in addition to the monomer units (A) and the monomer units (B), units as a copolymer ingredient derived from a monomer copolymerizable with the monomer (a) and the monomer (b). The copolymerizable monomer includes, for example, a carboxyl group-containing ethylenically unsaturated monomer other than the monomer (a), a conjugated diene monomer, a non-conjugated diene monomer, an aromatic vinyl monomer, an α, β-ethylenically unsaturated nitrile monomer, an acrylamidic monomer, a polyfunctional acrylic or methacrylic monomer, and other ethylenically unsaturated monomers.

As specific examples of the carboxyl group-containing ethylenically unsaturated monomer other than the monomer (a), there can be mentioned butenedioic acid mono-chainlike alkyl ester monomers such as monomethyl maleate, monoethyl maleate, mono-n-butyl maleate, monomethyl fumarate, monoethyl fumarate and mono-n-butyl fumarate; and carboxylic acid monomers such as acrylic acid, methacrylic acid, ethacrylic acid, itaconic acid, maleic acid, fumaric acid and citraconic acid. Of these, butenedioic acid mono-chain-like alkyl ester monomers are preferable. The carboxyl group may be an anhydrous carboxyl group. Namely, the carboxyl group-containing ethylenically unsaturated monomer may be an anhydrous carboxylic acid monomer such as, for example, maleic anhydride and citraconic anhydride.

As specific examples of the conjugated diene monomer, 1,3-butadiene, chloroprene and piperylene can be mentioned. As specific examples of the non-conjugated diene monomer, 1,4-pentadiene, dicyclopentadiene, norbornene, ethylidene norbornene, 1,4-hexadiene and norbornadiene can be mentioned. As specific examples of the aromatic vinyl monomer, styrene, a -methylstyrene and divinylbenzene can be mentioned. As specific examples of the α, β-ethylenically unsaturated nitrile monomer, acrylonitrile and methacrylonitrile can be mentioned. As specific examples of the acrylamidic monomer, acrylamide and methacrylamide can be mentioned. As specific examples of the polyfunctional acrylic or methacrylic monomer, ethylene glycol diacrylate, propylene glycol diacrylate, ethylene glycol dimethacrylate and propylene glycol dimethacrylate can be mentioned. As specific examples of the other ethylenically unsaturated monomers, ethylene, propylene, vinyl chloride, vinylidene chloride, vinyl acetate, ethyl vinyl ether and butyl vinyl ether can be mentioned.

The content of units of the above-mentioned copolymerizable monomer in the acrylic rubber is not particularly limited provided that the object of the present invention can be achieved, and the content of said units is preferably in the range of 0 to 49.9% by weight, more preferably 0 to 20% by weight.

The acrylic rubber of the present invention is produced by polymerizing the butenedioic acid monoester monomer (a) having an alicyclic structure and an acrylic acid ester monomer and/or a methacrylic acid ester monomer (b), and the optional copolymerizable monomer by a radical polymerization method. The polymerization procedure may be any of an emulsion polymerization procedure, a suspension polymerization procedure, a bulk polymerization procedure and a solution polymerization procedure. In view of ease for controlling the polymerization reaction, an emulsion polymerization procedure under normal pressure, which is conventionally adopted for the production of known acrylic rubbers, is preferable In the emulsion polymerization, an ordinary procedure can be adopted wherein conventional polymerization initiator, polymerization stopper and emulsifier can be used.

As specific examples of the polymerization initiator, there can be mentioned azo compounds such as azobisisobutyronitrile; organic peroxides such as disopropylbenzene hydroperoxide, cumene hydroperoxide and benzoyl peroxide; and inorganic peroxides such as sodium persulfate and ammonium persulfate. These polymerization initiators may be used either alone or as a combination of at least two thereof. The amount of polymerization initiator is preferably in the range of 0.01 to 1.0 part by weight based on 100 parts by weight of the monomer mixture.

The peroxide initiators can also be used in combination with a reducing agent as a redox polymerization initiator. The reducing agent used is not particularly limited, and, as specific examples thereof, there can be mentioned compounds containing a metal in a reduced state such as ferrous sulfate and cuprous naphthenate; sulfonic acid compounds such as sodium formaldehyde sulfoxylate and sodium methanesulfonate; and amine compounds such as dimethylaniline. These reducing agents may be used either alone or as a combination of at least two thereof. The amount of reducing agent is preferably in the range of 0.03 to 10 parts by weight per 1 part by weight of the peroxide.

As specific examples of the polymerization stopper, there can be mentioned hydroxylamine, hydroxylamine sulfate, diethylhydroxylamine, hydroxylamine sulfonic acid and its alkali metal salts, and sodium dimethyldithiocarbamate. The amount of polymerization stopper is not particularly limited, but is usually in the range of 0.1 to 2 parts by weight based on 100 parts by weight of the total monomers.

As specific examples of the emulsifier, there can be mentioned nonionic emulsifiers such as polyoxyethylene alkyl ether, polyoxyethylene alkylphenol ether, polyoxyethylene alkyl ester and polyoxyethylene sorbitanalkyl ester; anionic emulsifiers such as salts of a fatty acid, for example, myristic acid, palmitic acid, oleic acid or linolenic acid, alkyarylsulfonic acid salts, for example, sodium dodecylbenzenesulfonate, a higher alcohol sulfate ester salt, and alkylsulfosuccinate salts; cationic emulsifiers such as alkyltrimethylammonium chloride, dialkylammonium chloride and benzylammonium chloride; and copolymerizable emulsifiers such as sulfoesters of an α, β-unsaturated carboxylic acid, sulfate esters of an α, β-unsaturated carboxylic acid, and sulfoalkylaryl ether. Of these, anionic emulsifiers are preferable. These emulsifiers may be used either alone or as a combination of at least two thereof. The amount of emulsifier is usually in the range of 0.1 to 10 parts by weight based on 100 parts by weight of the total monomers.

The amount of water used in emulsion polymerization is usually in the range of 80 to 500 parts by weight, preferably 100 to 300 parts by weight based on 100 parts by weight of the monomer mixture.

According to the need, polymerization auxiliaries such as a molecular weight modifier, a particle size controller, a chelating agent and an oxygen scavenger can be used in the emulsion polymerization.

As specific examples of the molecular weight modifier, there can be mentioned mercaptans such as n-butyl mercaptan and t-dodecyl mercaptan; sulfides such as tetraethylthiuram sulfide and dipentamethylene sulfide; a -methylstyrene dimer; and carbon tetrachloride.

The emulsion polymerization can be carried out in any of batchwise, semi-batchwise and continuous manners. The polymerization is usually carried out at a temperature in the range of 0 to 70° C., preferably 5 to 50° C.

The acrylic rubber of the present invention preferably has a Mooney viscosity ($ML_{1+4}$, 100° C.) in the range of 10 to 80, more preferably 20 to 70 and especially preferably 30 to 70. If the Mooney viscosity is too small, a crosslinkable rubber composition tends to have poor processability and a crosslinked rubber product is liable to have poormechanical strength. In contrast, if the Mooney viscosity is too large, a crosslinkable rubber composition tends to have poor processability.

The acrylic rubber of the present invention is used as a crosslinkable acrylic rubber composition comprising the acrylic rubber and a crosslinking agent. The crosslinkable acrylic rubber composition is crosslinked into a crosslinked rubber product, which can be used for various rubber parts.

Crosslinkable Acrylic Rubber Composition

The crosslinkable acrylic rubber composition of the present invention comprises the above-mentioned acrylic rubber and a crosslinking agent. The crosslinking agent used may be any crosslinking agents conventionally used for acrylic rubber, but, amine compounds capable of easily forming a crosslinked structure by the reaction with a carboxyl group in the monomer units (A) are preferably used. A polyamine compound is especially preferable.

The polyamine crosslinking agent includes an aliphatic polyamine crosslinking agent and an aromatic polyamine crosslinking agent. But, polyamine compounds having a non-conjugated nitrogen-carbon double bond, such as guanidine compounds, are excluded from the polyamine crosslinking agent used in the present invention.

As specific examples of the aliphatic polyamine crosslinking agent, there can be mentioned hexamethylenediamine, hexamethylenediamine carbamate, N,N'-dicinnamylidene-1,6-hexanediamine, triethylenediamine and 1,8-diaza-bicylo[5.4.0]undecene-7. As specific examples of the aromatic polyamine crosslinking agent, there can be mentioned 4,4'-methylenedianiline, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy)biphenyl, m-xylylenediamine, p-xylylenediamine, 1,3,5-benzenetriamine and 1,3,5-benzenetriaminomethyl.

The amount of crosslinking agent used is usually in the range of 0.05 to 20 parts by weight, preferably 0.1 to 10 parts by weight, more preferably 0.2 to 7 parts by weight and especially preferably 0.3 to 5 parts by weight, based on 100 parts by weight of the acrylic rubber. When the amount of crosslinking agent is too small, the crosslinking reaction proceeds to an insufficient extent and a resulting crosslinked rubber product has poor retention of shape. In contrast, when the amount of crosslinking agent is too large, a crosslinked rubber product is too hard and has poor rubber elasticity.

The crosslinkable acrylic rubber composition may further comprise a crosslinking accelerator in combination with the crosslinking agent. The crosslinking accelerator is not particularly limited, but, as a crosslinking accelerator used in combination with a polyamine crosslinking agent, compounds having a base dissociation constant in the range of $10^{-12}$ to $10^6$ as measured in water at 25° C. are preferably used. These compounds include, for example, guanidine compounds, imidazole compounds, quaternary onium salts, tertiary phosphine compounds and alkali metal salts of a weak acid.

As specific examples of the above-mentioned compounds, there can be mentioned guanidine compounds such as 1,3-diphenylguanidine and 1,3-diorthotolylguanidine; imidazole compounds such as 2-methylimidazole and 2-phenylimidazole; quaternary onium salts such as tetra-n-butylammonium bromide and octadecyl-tri-n-butylammonium bromide; tertiary phosphine compounds such as triphenylphosphine and tri-p-tolylphosphine; and alkali metal salts of a weak acid, such as sodium salts and potassium salts of an inorganic weak acid such as phosphoric acid or carbonic acid, or an organic weak acid such as stearic acid or lauric acid.

The amount of crosslinking accelerator is preferably in the range of 0.1 to 20 parts by weight, more preferably 0.2 to 15 parts by weight especially preferably 0.3 to 10 parts by weight,. based on 100 parts by weight of the acrylic rubber. When the amount of crosslinking accelerator is too large, the rate of crosslinking reaction tends to be too high and blooming of the crosslinking accelerator to the surface of a crosslinked rubber product occurs, and the crosslinked rubber product is liable to be too hard. In contrast, when the crosslinking accelerator is not used, a crosslinked rubber product occasionally has poor tensile strength, and exhibits large change in elongation and tensile strength after heat-loading.

The crosslinkable acrylic rubber composition may further comprise a monoamine compound to prevent or suppress undesirable sticking to a metal occurring when the rubber composition is roll-milled or Banbury-treated, and thus, to improve the processability.

The monoamine compound used includes aromatic monoamine compounds and aliphatic monoamine compounds. These monoamine compounds may be any of mono-primary amine compound, mono-secondary amine compounds and mono-tertiary amine compounds. The monoamine compounds may be used either alone or as a combination of at least two thereof. In the case when the monoamine compound is used alone, a mono-primary amine compound is preferable. In the case when at least two monoamine compounds are used in combination, a combination of an aliphatic mono-secondary amine compound with an aliphatic mono-tertiary amine compound is preferable.

The mono-primary amine compound includes aliphatic mono-primary amine compounds, alicyclic mono-primary amine compounds, aromatic mono-primary amine compounds, amino alcohols and amino-oxo compounds. Of these, aliphatic mono-primary amine compounds are preferable. Aliphatic mono-primary amine compounds having 8 to 20 carbon atoms are especially preferable. As specific examples of the preferable aliphatic mono-primary amine compounds, there can be mentioned octylamine, decylamine, dodecylamine, tetradecylamine, cetylamine, octadecylamine, nonadecylamine and cis-9-octadecenylamine.

As specific examples of aliphatic mono-secondary amine compounds, there can be mentioned dioctylamine, didecylamine, didodecylamine, ditetradecylamine, dicetylamine, dioctadecylamine, di-cis-9-octadecenylamine and dinonadecylamine. As specific examples of aliphatic mono-tertiary amine compounds, there can be mentioned N,N-dimethyldodecylamine, N,N-dimethyltetradecylamine, N,N-dimethylcetylamine, N,N-dimethyloctadecylamine and N,N-dimethylbehenylamine.

The amount of monoamine compounds is 0.05 to 20 parts by weight, preferably 0.1 to 10 parts by weight in total, based on 100 parts by weight of the acrylic rubber. When a mono-primary amine compound is used alone, its amount is preferably in the range of 0.1 to 10 parts by weight, more preferably 0.2 to 5 parts by weight. When an aliphatic mono-secondary amine compound and an aliphatic mono-tertiary amine compound are used in combination, the amount thereof is preferably in the range of 0.2 to 10 parts by weight, more preferably 0.5 to 7 parts by weight in total. When the amount of monoamine compound is too small, the effect of preventing or suppressing sticking of the acrylic rubber composition to metal is often poor, and the processability is not improved. In contrast, when the amount of monoamine compound is too large, blooming of the monoamine compound to the surface of a crosslinked rubber product tends to occur and the crosslinked rubber product is liable to have poor mechanical strength and large permanent set.

According to the need, additives can be incorporated in the crosslinkable acrylic rubber composition, which include, for example, a reinforcing agent, a filler, an antioxidant, a light stabilizer, a plasticizer, a lubricant, a tackifier, a fire retardant, a mildew proofing agent, an antistatic agent and a colorant.

Further, according to the need, polymeric materials such as rubbers other than the acrylic rubber (A), elastomers and resins can be incorporated in the crosslinkable acrylic rubber composition. As specific examples of the polymeric materials, there can be mentioned rubbers such as natural rubber, acrylic rubber other than the acrylic rubber (A), polybutadiene rubber, polyisoprene rubber, styrene-butadiene rubber and acrylonitrile-butadiene rubber; elastomers such as olefin elastomer, styrene elastomer, vinyl chloride elastomer, polyester elastomer, polyamide elastomer, polyurethane elastomer and polysiloxane elastomer; and resins such as polyolefin resin, polystyrene resin, polyacrylic resin, polyphenylene-ether resin, polyester resin, polycarbonate resin and polyamide resin.

The acrylic rubber composition can be prepared by an appropriate mixing procedure such as roll mixing, Banbury mixing, screw mixing or solution mixing. The order in which required ingredients are mixed together is not particularly limited, but, it is preferable that, first, ingredients which do not easily react nor are easily decomposed upon heating are thoroughly mixed, and then, ingredients which easily react or are easily decomposed upon heating, such as a crosslinking agent, are added and mixed together at a low temperature within a short time so that the latter ingredients do not react nor are decomposed.

Shaping and Crosslinking of Crosslinkable Acrylic Rubber Composition

The method of shaping the crosslinkable acrylic rubber composition is not particularly limited. For example, molding methods using a mold such as compression molding, injection molding and transfer molding, and extrusion shaping can be adopted. The procedure by which the shaping is conducted can appropriately chosen depending upon the shape of crosslinked rubber article and other factors, and, there can be adopted a simultaneous procedure wherein shaping and crosslinking are simultaneously conducted, and a procedure wherein shaping and crosslinking are separately conducted in this order.

In a molding using a mold, such as compression molding, injection molding and transfer molding, the crosslinkable acrylic rubber composition is filled in a mold having a cavity or cavities each forming a crosslinked rubber product article, to be thereby shaped. The filled composition is heated usually in the range of 130 to 220° C., preferably 140 to 200° C. to be thereby crosslinked (primary crosslinking), and, if desired, the composition is further heated at a temperature in the above-mentioned range for 1 to 48 hours in an oven or by hot air or steam whereby the composition is further crosslinked (secondary crosslinking).

More specifically, the compression molding is carried out by a method wherein a stock of the crosslinkable acrylic rubber composition is pre-shaped by, for example, a mill or extruder into a sheet or ribbon shape. Then the pre-shaped sheet or ribbon is placed in a cavity or cavities of a mold, and the mold is closed and the content is heated under a pressure of, for example, about 15 MPa.

In the transfer molding, the crosslinkable acrylic rubber composition is milled by, for example, a roll into a sheet, the sheet is placed in a pot and filled in a closed cavity or cavities by a piston where the rubber composition is heated under a pressure of several tens MPa to be thereby shaped. In the transfer molding, an operation of taking a molded article from a mold is not needed, and therefore, the molding cycle can be shortened by about 50% and uniform crosslinking can be achieved even for a thick molded product, as compared with compression molding.

In the injection molding, the crosslinkable acrylic rubber composition is a stock of the crosslinkable acrylic rubber composition is pre-shaped by an extruder into a strip, or, if desired, the strip is further cut into particles. The strip or particles are fed to a feed hopper, and heated to a temperature not higher than 90° C. to be thereby plasticized in a cylinder. Then the plasticized composition is injected through a nozzle by an in-line screw or a plunger into a cavity or cavities where the rubber composition is heated under a pressure of several tens MPa to 100 MPa to be thereby molded. In the injection molding, the feed of the rubber composition to an injection molding machine is easy and an operation of taking a molded article from a mold is not needed, and therefore, the molding cycle can be shortened and uniform crosslinking can be achieved even for a thick molded article, as compared with a compression molding.

In the extrusion shaping, an extrusion procedure generally adopted for shaping rubbers can be adopted. More specifically, the crosslinkable acrylic rubber composition is milled by, for example, a roll to form a stock sheet. The stock sheet is fed through a hopper into an extruder, and the stock sheet is conveyed to the head of extruder by a revolving screw while the stock sheet is heated to be thereby softened by the barrel of extruder. Then the rubber composition is extruded through an orifice of die having a predetermined sectional shape to give an extruded shaped article of continuous length with a desired section, such as a plate, a rod, a pipe, a hose or articles of special section. The ratio of barrel length (L)/barrel inner diameter (D) of the extruder is usually in the range of 10/1 to 1/30, preferably 20/1 to 25/1. The barrel temperature is usually in the range of 50 to 120° C., preferably 60 to 110° C. The die temperature is usually in the range of 70 to 130° C., preferably 80 to 100° C.

In a midway of the barrel, a compression zone is provided where the shaft diameter is increased toward the head of extruder so that the screw channel depth is decreased, or the screw pitch is decreased along the shaft length whereby a strong shearing force is applied to the rubber composition by the mutual action between the screw and the barrel. The rubber composition is compressed in the compression zone while an exothermic heat is generated in the rubber composition as well as the composition is heated by the barrel. The compression ratio in the compression zone is usually in the range of 1.2 to 2.0, preferably 1.6 to 2.0.

A crosslinked acrylic rubber article can be obtained by crosslinking the crosslinkable acrylic rubber composition of the present invention by heating simultaneously with shaping or after shaping. The heating temperature is preferably in the range of 130 to 220° C., more preferably 140 to 200° C. The crosslinking time is preferably in the range of 30 seconds to 5 hours. The procedure for heating can appropriately be chosen from those which are conventionally used for crosslinking rubber compositions, such as press heating, steam heating, oven heating and hot-air heating. To crosslink the inside of the shaped rubber composition to a desired extent, a post crosslinking may be additionally carried out after crosslinking is carried out once. The post crosslinking time varies depending upon the heating procedure, the crosslinking temperature and the shape of crosslinked rubber article, but it is preferably in the range of 1 to 48 hours. The heating procedure and the heating temperature may be appropriately chosen.

EXAMPLES

The invention will now be specifically described by the following examples and comparative examples, wherein parts and % are by weight unless otherwise specified.

Properties of a rubber, a rubber composition and a crosslinked rubber article were evaluated by the following methods.

(1) Mooney Viscosity

Mooney viscosity of rubber was measured at a temperature of 100° C. according to JIS K6300.

(2) Scorch Stability

Mooney scorch time (t5) was measured at a temperature of 125° C. according to JIS K6300. The larger the Mooney scorch time (t5), the better the scorch stability.

(3) Extrusion Shapability

A crosslinkable acrylic rubber composition was extrusion-shaped under the following conditions.

Extruder: Type D20-10, made by Toyo Seiki Mfg. Co.
Single screw, barrel diameter: 20 mm
Compression ratio: 1.6
Barrel temperature: 60° C.
Head temperature: 80° C.

The following characteristics (i), (ii) and (iii) of the thus-obtained extrudate were evaluated by a Garvey die extrusion test method, evaluation method A, according to ASTM D2230-77 method A. The evaluation results were expressed by the four ratings wherein point 4 is the best and point 1 is the worst.

(i) Smoothness of the surface of extrudate
(ii) Sharpness and continuity of 30° edge
(iii) Sharpness and continuity of corners other than 30° edge (4) Mold Filling Property (Fluidity)

Injection molding of a rubber composition was conducted under the following conditions by using a 25 t injection molding machine available from Mitomo Industries Co.

Mold: spiral flow type
Screw temperature: 70° C.
Screw revolution: 50 rpm
Mold temperature: 190° C.
Crosslinking time: 1 minute
Amount of injection: 13 ml
Mold pressure: 20 MPa The length of the rubber composition flown in the spiral flow mold, i.e., a position of tip of the rubber composition flown was measured by a reading of scale on the spiral flow mold. The flowability of rubber composition was expressed by the measured length of rubber composition flown in the mold. The longer the measured length, the better the mold filling property.

(5) Residual Flashes

Press crosslinking was repeated 10 times by using the same mold as used for the preparation of a test specimen for evaluation of permanent set as mentioned below. The occurrence of flashes remaining on the mold when a molded sheet was released from the mold in each press crosslinking operation was observed. The evaluation result was expressed by the cumulative frequency of occurrence of residual flashes. The frequency of occurrence of residual flashes was counted based on whether a residual flash was observed or not irrespective of size or amount of each flash. The fewer the frequency of occurrence of residual flashes, the better the shaping characteristic.

(6) Dry Physical Properties and Heat Resistance

A crosslinkable acrylic rubber composition was pressed at a temperature of 170° C. for 20 minutes whereby the rubber composition was crosslinked and shaped into a crosslinked sheet. The sheet was cut into a size of 15cm×15cm×2mm, and then, left to stand at a temperature of 170° C. for 4 hours for post crosslinking. The post crosslinked sheet was punched into a desired shape to give a test specimen.

Dry physical properties were evaluated as follows. That is, strength at break (tensile strength) and elongation at break (elongation) were measured by the tensile testing method according to JIS K6251, and hardness was measured by the hardness testing method according to JIS K6253.

Heat resistance was evaluated according to JIS K6257 wherein elongation and hardness were measured after exposure to hot air at 175° C. for 168 hours. Heat resistance was expressed by the changes (%) in elongation and hardness between the measurement at normal temperature before the hot-air heat aging and the measurement after the hot-air heat aging. The smaller the changes in elongation and hardness, the better the heat resistance.

(7) Permanent Set

A crosslinkable acrylic rubber composition was pressed at a temperature of 170° C. for 20 minutes whereby the rubber composition was crosslinked and shaped to give a crosslinked O-ring test specimen having a diameter of 29 mm and a thickness of 12.5 mm. The specimen was maintained at a temperature of 170° C. for 4 hours for post crosslinking.

Permanent set was measured according to JIS K6262 as follows. The post-crosslinked specimen was compressed by 25%, and left to stand at a temperature of 175° C. for 70 hours. Then the specimen was released from the compression, and then, a permanent set thereof was measured.

Example 1

A polymerization vessel equipped with a thermometer, a stirring apparatus, a nitrogen-introducing tube and a pressure-reducing apparatus was charged with 200 parts of water, 3 parts of sodium lauryl sulfate, 58 parts of ethyl acrylate, 40 parts of n-butyl acrylate and 2 parts of monocyclohexyl fumarate. Procedures of deaeration under reduced pressure and replacement with nitrogen were repeated to thoroughly remove oxygen from the vessel. Then 0.002 part of sodium formaldehyde sulfoxylate and 0.005 part of cumene hydroperoxide were added to initiate emulsion polymerization at normal temperature under normal pressure. When the polymerization was continued until the polymerization conversion reached 95%, the emulsion polymerization liquid was coagulated with an aqueous calcium chloride solution and the obtained solid was washed with water and then dried to give acrylic rubber A.

The acrylic rubber A contained 58% of ethyl acrylate units, 40% of n-butyl acrylate units and 2% of monocyclohexyl fumarate units, and had a Mooney viscosity (ML$_{1+4}$, 100° C.) of 45. The composition of acrylic rubber A is shown in Table 1. 100 parts of the acrylic rubber A, 60 parts of carbon black (classified as N550 according to ASTM D1765), 2 parts of stearic acid (dispersant for carbon black, and softener), and 2 parts of 4,4'-bis(α,α-dimethylbenzyl)diphenylamine (antioxidant) were kneaded together at 50° C. by a Banbury mixer. To the thus-obtained mixture, 0.5 part of hexamethylenediamine carbamate (aliphatic diamine crosslinking agent) and 2 parts of di-o-tolylguanidine (crosslinking accelerator) were added, and the mixture was kneaded together at 40° C. by an open roll to obtain a crosslinkable acrylic rubber composition.

Mooney scorch time (t5), residual flashes and fluidity (mold filling property) of the crosslinkable acrylic rubber composition, and dry physical properties (tensile strength, elongation and hardness), heat resistance (change in elongation and change in hardness) and permanent set of a crosslinked rubber product thereof were evaluated. The results are shown in Table 2.

Example 2

By the same procedures as mentioned in Example 1, a crosslinkable acrylic rubber composition was prepared from the acrylic rubber A wherein 1.3 parts of 4,4'-diaminodiphenyl ether (aromatic diamine) was used instead of 0.5 part of hexamethylenediamine carbamate for the preparation of the rubber composition. All other conditions remained the same. Characteristics of the rubber composition were evaluated. The evaluation results are shown in Table 2.

Example 3

By the same procedures as adopted for the preparation of acrylic rubber A in Example 1, an acrylic rubber B was prepared wherein 2 parts of monocyclohexyl maleate was used instead of monocyclohexyl fumarate with all other conditions remaining the same.

By the same procedures as mentioned in Example 1, a crosslinkable acrylic rubber composition was prepared from the acrylic rubber B wherein 0.5 part of 4,4'-diaminodiphenyl ether (aromatic diamine) was used instead of 0.5 part of hexamethylenediamine carbamate for the preparation of the rubber composition. All other conditions remained the same. Characteristics of the rubber composition were evaluated. The evaluation results are shown in Table 2.

Comparative Example 1

By the same procedures as adopted for the preparation of acrylic rubber A in Example 1, an acrylic rubber C was prepared wherein n-butyl fumarate was used instead of monocyclohexyl fumarate with all other conditions remaining the same. The acrylic rubber C contained 58% of ethyl acrylate units, 40% of n-butyl acrylate units and 2% of monocyclohexyl fumarate, and had a Mooney viscosity ($ML_{1+4}$, 100° C.) of 45. The composition of acrylic rubber C is shown in Table 1.

By the same procedures as mentioned in Example 1, a crosslinkable acrylic rubber composition was prepared from the acrylic rubber C and characteristics of the rubber composition were evaluated. The evaluation results are shown in Table 2.

TABLE 1

Composition of Acrylic Rubbers

| | Kind of acrylic rubber | | | | | |
|---|---|---|---|---|---|---|
| | A | B | C | D | E | F |
| Ethyl acrylate | 58 | 58 | 58 | 38 | 38 | 38 |
| n-Butyl acrylate | 40 | 40 | 40 | 40 | 40 | 40 |
| 2-Methoxyethyl acrylate | — | — | — | 20 | 20 | 20 |
| Monocyclohexyl fumarate | 2 | — | — | — | — | — |
| Monocyclohexyl maleate | — | 2 | — | 2 | — | — |
| Mono-n-butyl fumarate | — | — | 2 | — | 2 | — |
| Mono-n-butyl maleate | — | — | — | — | — | 2 |

TABLE 2

| | Ex. 1 | Ex. 2 | Ex. 3 | Comp. Ex. 1 |
|---|---|---|---|---|
| Ingredients in acrylic rubber composition (parts) *1 | | | | |
| Acrylic rubber A | 100 | 100 | — | — |
| Acrylic rubber B | — | — | 100 | — |
| Acrylic rubber C | — | — | — | 100 |
| Hexamethylenediamine carbamate | 0.5 | — | — | 0.5 |
| 4,4'-Diaminodiphenyl ether | — | 1.3 | 0.5 | — |
| Di-o-tolylguanidine | 2 | 2 | 2 | 2 |
| Mooney scorch time (t5) (min) | 6.5 | 13.5 | 14.1 | 4.5 |

TABLE 2-continued

| | Ex. 1 | Ex. 2 | Ex. 3 | Comp. Ex. 1 |
|---|---|---|---|---|
| Dry physical properties | | | | |
| Tensile strength (MPa) | 11.6 | 12.1 | 12.6 | 11.6 |
| Elongation (%) | 240 | 230 | 220 | 210 |
| Hardness (JIS A) | 65 | 65 | 66 | 70 |
| Heat resistance | | | | |
| Change in elongation (%) | 13 | 10 | 9 | 14 |
| Change in hardness (%) | 1 | 3 | 2 | 1 |
| Permanent set (%) | 13 | 13 | 15 | 20 |
| Residual flash *2 | 0 | 0 | 0 | 2 |
| Fluidity (scale reading) | 4.2 | 4.52 | 4.74 | 3.46 |

*1 Each acrylic rubber composition further composes 60 parts of carbon black, 2 parts of stearic acid and 2 parts of 4,4'-bis(a,a-dimethylbenzyl)diphenylamine (antioxidant) (these ingredients are not recited above in the table)
*2 Accumulated frequency of residual flashes at 10 times molding As seen from Table 2, an acrylic rubber not containing units of a butenedioic acid monoester monomer having an alicyclic structure (Comparative Example 1) gives a crosslinkable acrylic rubber composition exhibiting an initial Mooney scorch time (t5) of shorter than 5 minutes and having poor process-stability.

In contrast, the acrylic rubber of the present invention (Example 1) gives a crosslinkable acrylic rubber composition exhibiting an initial Mooney scorch time (t5) of longer than 5 minutes and having good scorch stability. This advantageous effect is enhanced in the case when an aromatic diamine is used as a crosslinking agent (Examples 2 and 3). Further, the acrylic rubber of the present invention gives a crosslinkable acrylic rubber composition having good mold filling property and giving a crosslinked rubber article exhibiting sufficiently reduced permanent set and good heat stability (Examples 1-3).

Example 4

A polymerization vessel equipped with a thermometer, a stirring apparatus, a nitrogen-introducing tube and a pressure-reducing apparatus was charged with 200 parts of water, 3 parts of sodium laurylsulfate, 38 parts of ethyl acrylate, 40 parts of n-butyl acrylate, 20 parts of 2-methoxyethyl acrylate and 2 parts of monocyclohexyl maleate. Procedures of deaeration under reduced pressure and replacement with nitrogen were repeated to thoroughly remove oxygen from the vessel. Then 0.002 part of sodium formaldehyde sulfoxylate and 0.005 part of cumene hydroperoxide were added to initiate emulsion polymerization at normal temperature under normal pressure. When the polymerization was continued until the polymerization conversion reached 95%, the emulsion polymerization liquid was coagulated with an aqueous calcium chloride solution and the obtained solid was washed with water and then dried to give acrylic rubber D.

The acrylic rubber D contained 38% of ethyl acrylate units, 40% of n-butyl acrylate units, 20% of 2-methoxyethyl acrylate units and 2% of monocyclohexyl maleate units, and had a Mooney viscosity ($ML_{1+4}$, 100° C.) of 45. The composition of acrylic rubber D is shown in Table 1. 100 parts of the acrylic rubber D, 60 parts of carbon black (classified as N550 according to ASTMD1765), 2 parts of stearic acid (dispersant for carbon black, and softener), and 2 parts of 4,4'-bis(α,α-dimethylbenzyl)-diphenylamine (antioxidant) were kneaded together at 50° C. by a Banbury mixer. To the thus-obtained mixture, 0.5 part of 4,4'-diaminodiphenyl ether (aromatic polyamine crosslinking agent) and 2 parts of di-o-tolylguanidine (crosslinking accelerator) were added, and the mixture was kneaded together at 40° C. by an open roll to obtain a crosslinkable acrylic rubber composition.

Mooney scorch time (t5) and extrusion shapability of the crosslinkable acrylic rubber composition, and dry physical properties (tensile strength, elongation and hardness), heat resistance (change in elongation and change in hardness) and permanent set of a crosslinked rubber product thereof were evaluated. The results are shown in Table 3.

Comparative Example 2

By the same procedures as adopted for the preparation of acrylic rubber D in Example 4, an acrylic rubber E was prepared wherein 2 parts of mono-n-butyl fumarate was used instead of 2 parts of monocyclohexyl maleate with all other conditions remaining the same. The acrylic rubber E contained 38% of ethyl acrylate units, 40% of n-butyl acrylate units, 20% of 2-methoxymethyl acrylate and 2% of mono-n-butyl fumarate, and had a Mooney viscosity ($ML_{1+4}$, 100° C.) of 45. The composition of acrylic rubber E is shown in Table 1.

By the same procedures as mentioned in Example 4, a crosslinkable acrylic rubber composition was prepared from the acrylic rubber E and characteristics of the rubber composition were evaluated. The evaluation results are shown in Table 3.

Comparative Example 3

By the same procedures as adopted for the preparation of acrylic rubber D in Example 4, an acrylic rubber F was prepared wherein 2 parts of mono-n-butyl maleate was used instead of 2 parts of monocyclohexyl maleate with all other conditions remaining the same. The acrylic rubber F contained 38% of ethyl acrylate units, 40% of n-butyl acrylate units, 20% of 2-methoxymethyl acrylate units and 2% of mono-n-butyl maleate units, and had a Mooney viscosity ($ML_{1+4}$, 100° C.) of 45. The composition of acrylic rubber F is shown in Table 1.

By the same procedures as mentioned in Example 4, a crosslinkable acrylic rubber composition was prepared from the acrylic rubber F and characteristics of the rubber composition were evaluated. The evaluation results are shown in Table 3.

TABLE 3

|  | Ex. 4 | Co. Ex. 2 | Co. Ex. 3 |
| --- | --- | --- | --- |
| Ingredients in acrylic rubber composition (parts) *1 |  |  |  |
| Acrylic rubber D | 100 | — | — |
| Acrylic rubber E | — | 100 | — |
| Acrylic rubber F | — | — | 100 |
| 4-4'-Diaminodiphenyl ether | 0.5 | 0.5 | 0.5 |
| Di-o-tolylguanidine | 2 | 2 | 2 |
| Mooney scorch time (t5) (min) | 17.8 | 10.4 | 10 |
| Extrusion processability |  |  |  |
| Edge | 4 | 3 | 2 |
| Smoothness | 4 | 2 | 2 |
| Corner | 4 | 3 | 3 |
| Dry physical properties |  |  |  |
| Tensile strength (MPa) | 11.2 | 10.8 | 10.6 |
| Elongation (%) | 220 | 200 | 200 |
| Hardness (JIS A) | 70 | 71 | 72 |
| Heat resistance |  |  |  |
| Change in elongation (%) | −5 | −8 | −14 |
| Change in hardness (%) | 8 | 8 | 11 |
| Permanent set (%) | 18 | 18 | 38 |

*1 Each acrylic rubber composition further comprises 60 parts of carbon black, 2 parts of stearic acid and 2 parts of 4,4'-bis(a,a-dimethylbenzyl)diphenylamine (antioxidant) (these ingredients are not recited above in the table)
*2 Accumulated frequency of residual flashes at 10 times molding As seen from Table 3, the acrylic rubber composition for extrusion shaping of the present invention exhibits a Mooney scorch time longer than 17 minutes and has good scorch stability and, when it is extrusion-shaped, it exhibits good shape stability and gives a shaped product with a smooth surface having good mechanical properties and good heat resistance, and exhibiting reduced permanent set (Example 4).

In contrast, a rubber composition comprising an acrylic rubber containing units of a butenedioic acid monoester having no alicyclic structure exhibits a short Mooney scorch time (t5) of about 10 minutes, and, when it is extrusion shaped, it exhibits poor shape stability and gives a shaped product with an unsatisfactory surface having poor mechanical properties and exhibiting undesirably large elongation change upon hot air aging test (Comparative Examples 2 and 3).

INDUSTRIAL APPLICABILITY

The acrylic rubber of the present invention and the crosslinkable acrylic rubber composition comprising the acrylic rubber are not scorched in the initial stage of processing and thus exhibit good scorch stability, and good shapability. More specifically, when they are extrusion shaped, scorch does not occur or occurs only to a minimized extent, and keeps good flowability. Thus they are well cast in a die. In the case when they are extrusion shaped, a shaped article having a smooth surface can be obtained. In the case when they are molded by, for example, compression molding, transfer molding or injection molding, good flowability can be kept when filled in a cavity of mold, that is, good shapability can be obtained. They do not stick to a mold when molded, and thus, they have good releasability and occurrence of residual flashes on a mold is minimized.

A shaped article obtained by shaping and crosslinking the crosslinkable acrylic rubber composition of the present invention has good heat resistance and exhibits sufficiently reduced permanent set.

In view of the above-mentioned beneficial properties, the crosslinkable acrylic rubber composition of the present invention can be widely used as rubber materials for sealers such as gaskets, oil-pan gaskets, oil seals and packings, which are made by molding and then crosslinking; covers for cylinder head; automobile hoses such as oil-cooler hoses, fuel hoses and air duct hoses; industrial hoses such as an exhaust hose provided in a high-temperature drying apparatus and placed in contact with high-temperature air, and other hoses; vibration insulators; and rubber parts such as tubes, belts and boots. Especially, molded articles of the rubber composition are suitable for sealers, and extrusion shaped articles thereof are suitable for hoses.

The invention claimed is:

1. A shaped article obtained by shaping and crosslinking a crosslinkable acrylic rubber composition comprising an acrylic rubber and a crosslinking agent, wherein said acrylic rubber is comprised of a copolymer comprising from 0.1 to 20% by weight of (A) units of a butenedioic acid monoester monomer having a monocycloalkane structure having from 3 to 20 carbon atoms and from 50 to 99.9% by weight of (B) units of at least one monomer selected from the group consisting of acrylic acid ester monomers and methacrylic acid ester monomers, wherein the butenedioic acid monoester monomer having a monocycloalkane structure is a monomer selected from the group consisting of a fumaric acid monocycloalkyl ester monomer and a maleic acid monocycloalkyl ester monomer.

2. The shaped article according to claim 1, wherein the crosslinking agent is a polyamine crosslinking agent.

3. The shaped article according to claim 1, wherein the content of crosslinking agent is in the range of from 0.05 to 20 parts by weight based on 100 parts by weight of the acrylic rubber.

4. The shaped article according to claim 1, which further comprises a compound having a base dissociation constant in the range of from $10^{-12}$ to $10^6$ as measured in water at 25° C. as a crosslinking accelerator in an amount in the range of from 0.1 to 20 parts by weight based on 100 parts by weight of the acrylic rubber.

5. The shaped article according to claim 1, which further comprises a monoamine compound in an amount in the range of from 0.05 to 20 parts by weight based on 100 parts by weight of the acrylic rubber.

6. The shaped article according to claim 1, which is a molded article.

7. The shaped article according to claim 6, wherein the molded article is obtained by compression molding, transfer molding or injection molding.

8. The shaped article according to claim 7, wherein the molded article is a sealer.

9. The shaped article according to claim 1, which is an extruded article.

10. The shaped article according to claim 9, wherein the extruded article is a hose member.

11. The shaped article according to claim 1, wherein the copolymer comprises from 0.1 to 20% by weight of (A) units of a butenedioic acid monoester monomer having an alcohol residue having from 3 to 20 carbon atoms selected from the group consisting of monocycloalkyl groups, from 50 to 99.9% by weight of (B) units of at least one monomer selected from the group consisting of acrylic acid alkyl ester monomers, methacrylic acid alkyl ester monomers, acrylic acid alkoxyalkyl ester monomers, methacrylic acid alkoxyalkyl ester monomers, acrylic acid hydroxyalkyl ester monomers and methacrylic acid hydroxyalkyl ester monomers, and from 0 to 49.9% by weight of units of a monomer copolymerizable with these monomers.

12. The shaped article according to claim 1, wherein the content of the units (A) of the butenedioic acid monoester monomer having a monocycloalkane structure is in the range of from 0.5 to 10% by weight.

13. The shaped article according to claim 1, wherein the acrylic rubber has a carboxyl group content in the range of from $5 \times 10^{-4}$ to $4 \times 10^{-1}$ per 100g of rubber.

14. The shaped article according to claim 1, wherein the monomer units (B) comprise from 30 to 100% by weight of units of a monomer selected from the group consisting of acrylic acid alkyl ester monomers and methacrylic acid alkyl ester monomers, and from 0 to 70% by weight of a monomer selected from the group consisting of acrylic acid alkoxyalkyl ester monomers and methacrylic acid alkoxyalkyl ester monomers.

15. The shaped article according to claim 1, wherein said acrylic rubber is comprised of a copolymer comprising from 0.1 to less than 5% by weight of (A) units of a monomer selected from the group consisting of monocyclohexyl fumarate and monocyclohexyl maleate and from 50 to 99.9% by weight of (B) units of at least one monomer selected from the group consisting of acrylic acid ester monomers and methacrylic acid ester monomers.

* * * * *